F. B. CROCKER.
APPARATUS FOR AUTOMATIC REGULATION OF RECTIFIERS AND ROTARY CONVERTERS.
APPLICATION FILED APR. 4, 1908.

1,012,524.

Patented Dec. 19, 1911.

4 SHEETS—SHEET 1.

Witnesses =
Samuel W. Balch
Frank C. Cole

Inventor,
Francis B. Crocker,
by Thomas Ennis, Jr.,
Attorney.

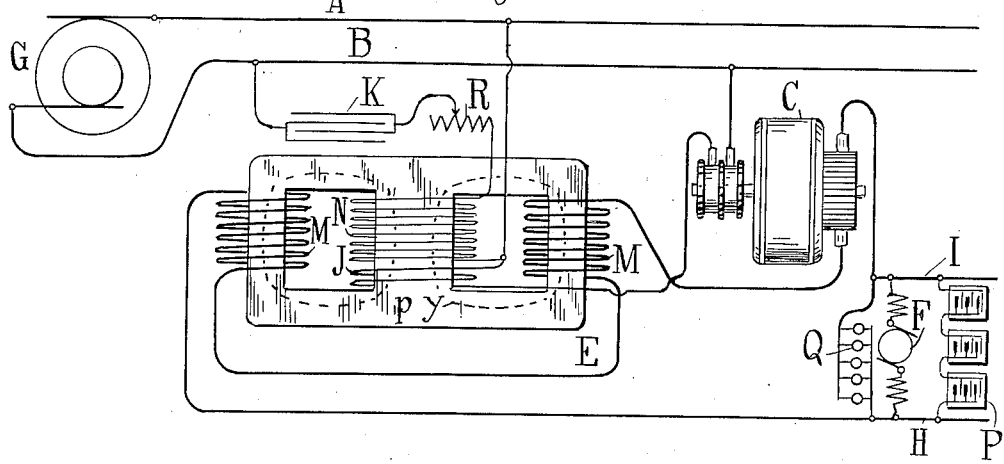
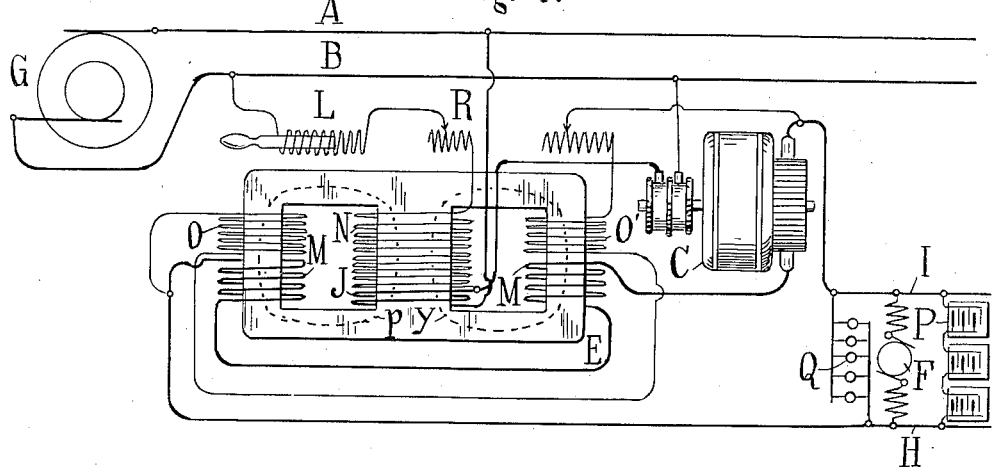

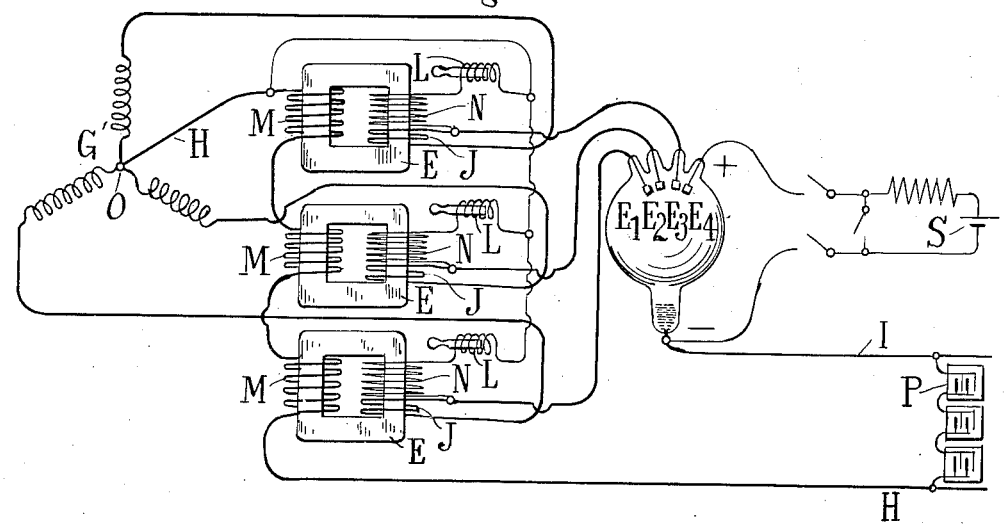
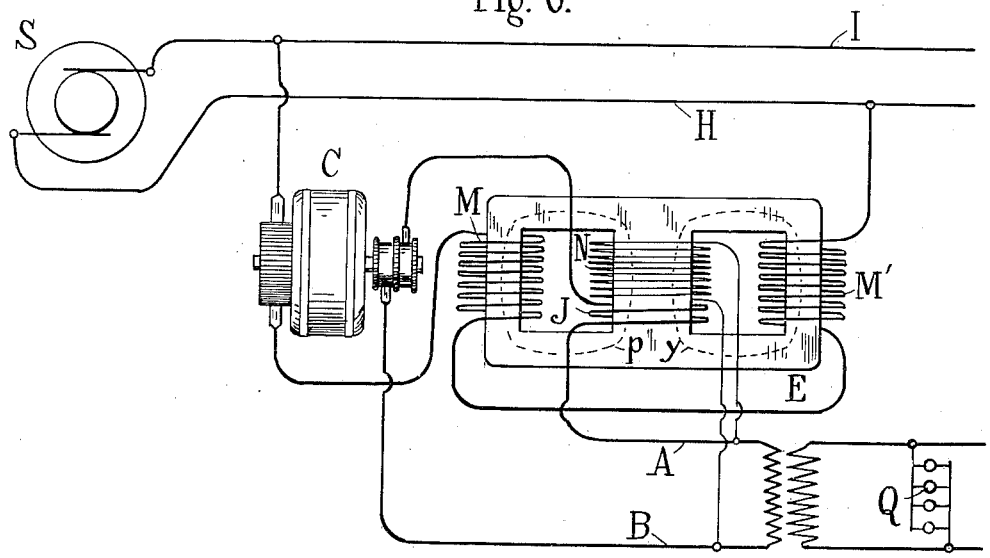

Zero Load.

Half Load.

Full Load.

UNITED STATES PATENT OFFICE.

FRANCIS B. CROCKER, OF NEW YORK, N. Y.

APPARATUS FOR AUTOMATIC REGULATION OF RECTIFIERS AND ROTARY CONVERTERS.

1,012,524.        Specification of Letters Patent.     Patented Dec. 19, 1911.

Original application filed July 25, 1904, Serial No. 218,053. Divided and this application filed April 4, 1908. Serial No. 425,110.

*To all whom it may concern:*

Be it known that I, FRANCIS B. CROCKER, a citizen of the United States of America, and a resident of the city, county, and State of New York, have invented certain new and useful Improvements in Apparatus for Automatic Regulation of Rectifiers and Rotary Converters, of which the following is a specification.

This invention relates to an apparatus for the automatic regulation of electric currents in conjunction with their conversion from alternating current into direct current or from direct current into alternating current by any suitable rectifier or rotary converter.

The object of the invention is to provide a simple and effective apparatus without moving parts to secure automatic regulation by inductive action between the alternating current circuits as modified by the influence of the direct current. In this way it is possible to cause the voltage to remain constant or to rise with increase of load, and so overcome the drop of potential that usually takes place in the generator, transmitting lines, transformer, and other parts of the circuits when under load. A typical form of this apparatus comprises a magnetizable core with series and shunt coils connected to the alternating current leads through which current passes to the rectifier, and a series coil connected in one of the direct-current leads of the rectifier.

Figure 1:
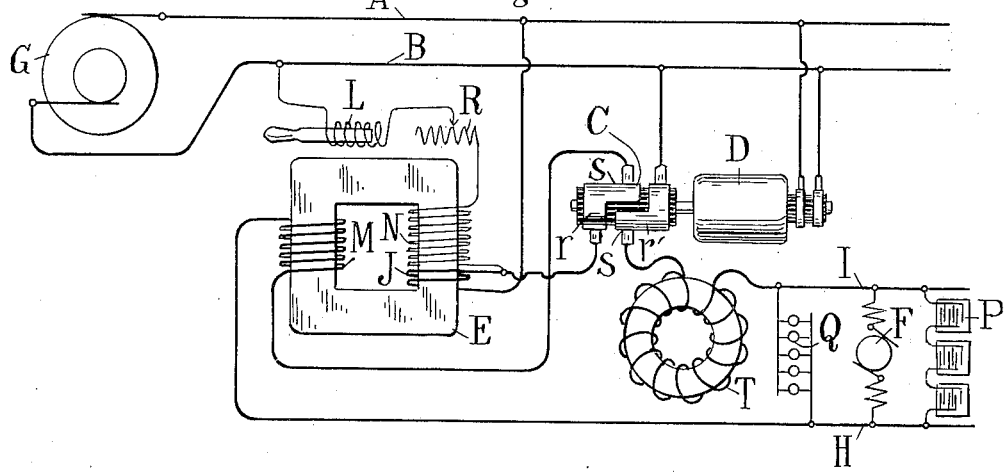
Figure 2:
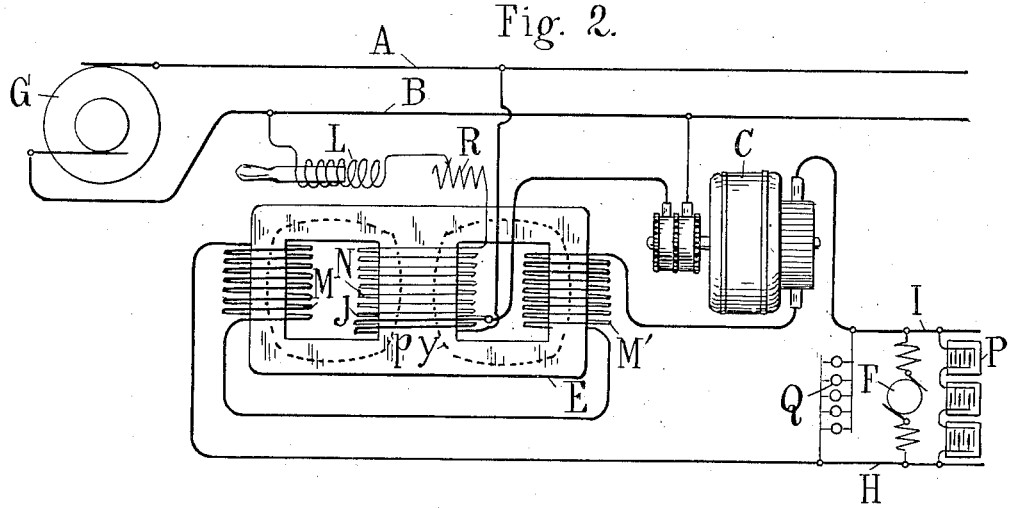
Figure 7:
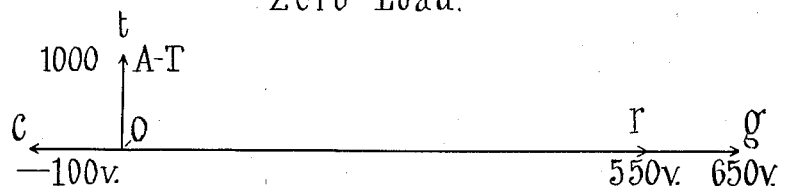
Figure 8:
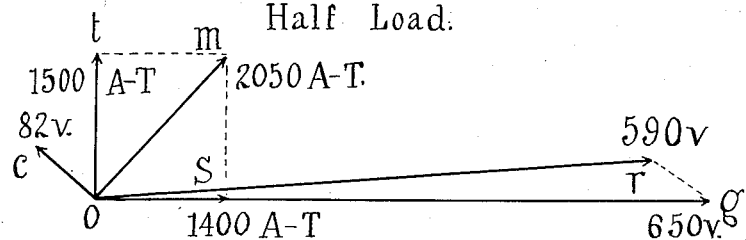
Figure 9:
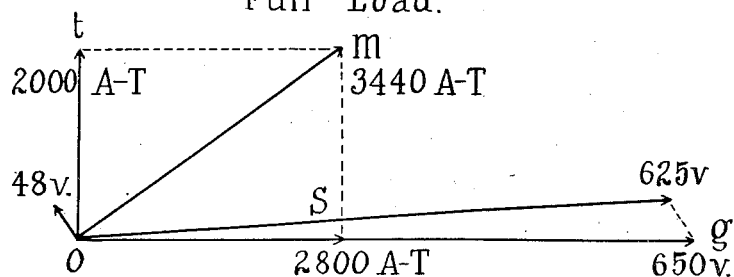

In the accompanying four sheets of drawings which form a part of this application,—Figure 1 illustrates an alternator, alternating conductors supplied therefrom, a rectifier, direct-current circuits supplied through the rectifier from the alternating-current circuit, and a core with regulating coils and connections, as above indicated. Fig. 2 illustrates a modified arrangement, in which the core has a double magnetic circuit, and the direct-current coil is divided into two portions oppositely wound on the two parts of the magnetic circuit, to neutralize inductive effects, a rotary converter being used as a rectifier. Fig. 3 illustrates a modification of the preceding arrangement in which capacity is inserted in the shunt circuit. Fig. 4 illustrates a modification of the arrangement of Fig. 2 in which direct-current shunt coils are employed in addition to the direct-current series coils. Fig. 5 illustrates a tri-phase alternator with a regulating apparatus similar to that of Fig. 1 inserted in each of the three alternating-current leads from the alternator, and a mercury-vapor rectifier. Fig. 6 illustrates a direct-current generator, direct-current conductors fed thereby, a rotary converter, alternating-current circuits supplied with energy through the converter from the direct-current circuit and a regulating apparatus similar to that illustrated in Fig. 2. Figs. 7, 8 and 9 represent by vector diagrams the values and phase relations at respectively zero, half and full loads existing in a specific regulating apparatus constructed and operated according to my invention.

Referring first to Fig. 1, a single-phase generator G feeds current to alternating current conductors A and B. These conductors supply energy through a rectifier C to direct-current leads H I which deliver the energy to direct-current consuming devices such as storage battery cells P, motors F or lamps Q. The rectifier or rectifying commutator consists of slip rings r r' and a commutator s driven by a synchronous motor D which revolves in synchronism with the alternations of the current supplied from the generator. In series with one of the alternating current conductors A leading to the rectifier is a coil J wound on a laminated iron core E. A shunt coil N is also wound in the same direction on the core, and in the arrangement illustrated in this figure is connected at one end to a branch from the alternating-current conductor A between the series coil J and the rectifier. The function of this shunt coil is to induce a certain electromotive force in the coil J acting in the alternating-current circuit in opposition to that produced by the generator G. Hence the actual alternating electromotive force supplied to the rectifier is less than that of the generator. A third coil M is also wound on the core, and is connected in series with one of the direct-current leads H. A choke coil T may also be placed in series in the direct-current circuit to prevent the flow of any alternating current in this circuit which might otherwise be induced in the coil M.

The operation of the apparatus in regulating current is as follows: When the load in the direct-current circuit is increased, for example by the insertion of additional lamps Q, motors F, or storage batteries P to be charged, the additional current flow in the coil M tends to saturate magnetically the core E so that the mutual induction between the alternating-current coils N and J is reduced. The effect of this reduction is to diminish the opposing electromotive force induced in the coil J by the coil N. The resultant voltage in the alternating-current circuit will therefore be increased, and the voltage in the direct-current circuit which is supplied by the rectified alternating-current will likewise be increased. When the magnetizing effect of the direct-current coil M tends to saturate the core E, the self-induction of the shunt coil N is reduced so that the current flowing through it will rise in value. In order to prevent this rise from becoming excessive an inductance L, or a resistance R, or both, may be inserted in series with the coil N. If either or both of these have a considerable value compared with the self-induction of the coil N, then the variation of that self-induction will not cause too large an increase of current in the coil. It is convenient to have this inductance or resistance adjustable, as shown, so as to set or control the regulating effects. In order that the initial opposing electromotive force may be exactly opposite in phase with respect to the electromotive force of the generator, the current in the shunt coil N should lag 90° behind the generator electromotive force. The opposing electromotive force in turn lags 90° behind the shunt current, thereby producing a total phase difference of 180°, or exact opposition. The reactance due to the inductance L in the shunt circuit is usually made large compared with the resistance R so that the current shall have a lag of approximately 90°. Another advantage thus secured is the fact that inductance consumes no energy whereas resistance does. Owing to these phase relations the opposing electromotive force of the coil J results in a transformation of electrical energy from it to the shunt coil N. At no load this electromotive force has full value, but the current being zero the energy is also zero. With any appreciable load— one-half, for example—the current is also one-half of the full value and the opposing electromotive force should then be approximately one-half of its initial amount in order that the resultant boosting effect (i. e. rise in voltage) may be nearly proportional to the load. Under these conditions an amount of energy equal to the product of one-half of the full current by about one-half of the maximum opposing electromotive force (less the losses) is transferred from the series coil J to the shunt coil N. In consequence a larger current and lower electromotive force than the generator produces may thus be supplied to the rectifier. As full load is approached, the main alternating current in the series coil J rises, but its opposing electromotive force falls owing to the magnetic saturation of the iron core by the direct-current coil M. Theoretically this electromotive force should become zero at full load. Practically it still has a fraction of its original value since the magnetic saturation is not complete.

In the arrangement illustrated in Fig. 2 a core is employed having a double magnetic circuit, the two parts or paths of which are indicated by the dotted lines $y$ and $p$. The alternating-current coils N and J are wound on the part of the core common to both circuits, and the direct-current coil is divided into two portions M and M' which are oppositely wound on the other two parts of the magnetic circuit. These coils are therefore balanced with respect to the alternating flux induced by the alternating-current coils so that no alternating current is induced in the direct-current coils, and a choke coil in the direct-current circuit is unnecessary. This balance is less perfect when the load increases, because the direct-current magnetization is in one direction and allows the alternating currents to vary the flux less in that direction than in the other, especially as saturation is approached. On the other hand, this saturation also tends to diminish inductive action, so that objectionable effects are largely avoided.

In the arrangement illustrated in Fig. 3, capacity K is inserted in the shunt circuit in lieu of the adjustable inductance L. The effect of this capacity is to advance the phase relation of the current in the shunt circuit. Assuming that this advance has its maximum value of 90°, the electromotive force set up in the shunt coil will lag 90° behind the current, hence it will be in phase with the impressed electromotive force. It follows therefore that the current in the series winding being in phase with the impressed electromotive force should be opposite in direction to that in the shunt coil. In other words, the two currents divide at their common junction as shown and flow in opposite directions around the central portion of the iron core in order that the electromotive force of the shunt coil may oppose the electromotive force of the series coil. Fig. 3 also shows that the shunt coil may draw energy from the alternating-current conductors directly, instead of after the alternating current has passed through the series coil as in the connections illustrated in the preceding figure. In this figure the shunt coil is supplied by a constant or falling electromotive force, and in Figs. 1 and 2 by a rising electromotive force. The adjustable regulating resistance R, inductance L and capacity K may obviously be used individually or in combinations, and being variable may have various absolute as well as relative values. In any case such element or elements of my organization may be designated by or included in the general term impedance.

The arrangement illustrated in Fig. 4, employs connections substantially as in Fig. 2, except that a direct-current shunt consisting of coils O and O' is opposed to the series coils M and M'. The direct-current magnetization thus obtained depends upon the difference between the ampere-turns in the two sets of coils so that the effect of variations in load may be accentuated. In this case it is also a fact that there is an initial direct-current magnetomotive force at no load, while in the preceding arrangement it is proportional to the load.

In the arrangement of Fig. 5, the invention is applied in connection with a mercury-vapor rectifier, such as the Cooper-Hewitt rectifier. The regulating devices constituting my invention are inserted in each of the three alternating-current leads from a suitable source of three-phase current G'. The currents through the series coils J J J are led to the positive electrodes $E_1$ $E_2$ $E_3$ in the upper part of the mercury-vapor rectifier. The current through the shunt coils N N N return to the neutral point of the three-phase generator. The direct-current leads H I are connected respectively to the neutral point of the generator and the negative side of the rectifier. The rectifier has a fourth positive electrode $E_4$, through which, and the negative pole of the rectifier, current is applied from a suitable source S for starting the rectifier.

In the arrangement illustrated in Fig. 6, the invention is applied to the regulation of electric current in conjunction with its conversion from direct into alternating current. A direct-current generator S feeds current to direct-current leads H I. These conductors supply energy through a rotary converter to alternating-current leads A B which deliver the energy to consuming devices either directly or through transformers. The regulating apparatus is as described in connection with Fig. 2, and consists of a series coil J connected in one of the alternating-current leads, a shunt coil N which is connected across the alternating-current leads, and a two-part direct-current series coil M M' inserted in one of the direct-current leads through which direct current reaches the rotary converter. As before, the shunt coil N induces an initial opposing electromotive force in the series coil J of the alternating-current circuit, producing a resultant electromotive force less than that given out by the converter. The direct-current in the coils M M', increasing directly with the load, tends to saturate magnetically the core E and suppress the opposing electromotive force, thus automatically raising the resultant electromotive force of the alternating-current circuit A B, in accordance with my invention.

In order to show the phase relations existing in my automatic regulating device and to illustrate how it may be designed to fulfil practical conditions, the following example is given: The arrangement of apparatus and connections illustrated in Fig. 2 is adopted, and the central portion of the iron core E is assumed to be $11'' \times 8'' = 88$ square inches, each end portion being half as large or $5\frac{1}{2} \times 8 = 44$ square inches because there are two magnetic circuits. The maximum flux through the central part may be taken as $88 \times 87,000 = 7,656,000$ lines, being 87,000 lines per square inch or 13,500 lines per square centimeter. Each magnetic circuit $p$ or $y$ is 40 inches in length and requires about 25 ampere-turns per inch or $40 \times 25 = 1,000$ ampere-turns in the shunt coil N to produce a flux density of 13,500. At a frequency of 60 this flux will set up about 20 volts effective electromotive force in each turn of the series coil J, so that 5 turns will produce 100 volts in opposition to the electromotive force of the alternating-current generator G. This opposing electromotive force is represented by the line $o\ c$ in Fig. 7 and the generator electromotive force by the line $o\ g$. Assuming the latter to be 650 volts the resultant alternating electromotive-force supplied to the rotary converter (C in Fig. 2) is 550 volts at no load, being represented by $o\ r$ in Fig. 7. At half load the series alternating current coil J will carry 280 amperes (maximum) so that its magnetomotive force is $280 \times 5 = 1,400$ ampere-turns, and is in phase with the generator electromotive force as indicated by the line $o\ s$ in Fig. 8. This combined with the shunt ampere-turns $o\ t$ which are assumed to have increased to 1,500, produces a resultant $o\ m$ of 2,050 ampere-turns, being the total alternating magnetomotive force. Assuming 13 turns in each of the direct-current coils M M' and a current of 138 amperes, the magnetomotive force of each coil is $138 \times 13$ or approximately 1,800 ampere-turns. This being constant and in one direction, the alternating magnetomotive force combines with it to give a maximum of $1,800 + 2,050 = 3,850$ ampere-turns, and a minimum of $1,800 - 2,050 = -250$ ampere-turns. The variation in flux thus produced will set up in the series alternating-current coil J an electromotive force of about 82 volts lagging 90° with respect to the phase of the alternating magnetomotive force as represented by the line $o\ c$ in Fig. 8. This electromotive force acting with that of the generator $o\ g$ gives a resultant $o\ r$ of 590 volts being 40 volts higher than at zero load.

At full load the series alternating-current coil J carries 560 amperes, giving 560×5= 2,800 ampere-turns, indicated by the line o s in Fig. 9. This combines with o t, the shunt magnetomotive force, which has become 2,000 ampere-turns and gives the resultant o m of 3,440 ampere-turns for the total alternating magnetomotive force. The direct-current at full load is 276 amperes giving a magnetomotive force of 276×13 or approximately 3,600 ampere-turns in each coil M M'. This in combination with the alternating magnetomotive force produces a maximum of 3,600+3,440=7,040 and a minimum of 3,600−3,440=160 ampere-turns. The magnetic flux produced by the 7,040 maximum ampere-turns is not very much greater than that produced by the 1000 ampere-turns at zero load or the 3850 ampere-turns at half load, because the iron core is nearly saturated in all three cases. On the other hand, the 160 ampere-turns which is the minimum value at full load produces a considerable flux which is in the same direction as the maximum because the magnetomotive force is positive in both cases. Hence the actual flux variation and electromotive force induced are less at full load than at half load or at zero load. The operation of the apparatus depends upon this very saturation of the magnetic circuits. Of course this saturation is not complete, but is effective nevertheless, in reducing the electromotive force generated in the coil J. Any distortion or shifting of the magnetic flux waves due to the saturation or direct current magnetization may tend to set up unbalanced electromotive forces in the parts of the direct-current winding, but the flow of alternating current therein can be checked by the presence of inductance as represented at t in Fig. 1. The resulting flux variation generates an alternating electromotive force of 48 volts o c in the series coil J which is combined with o g the generator electromotive force to form the resultant o r amounting to 625 volts, being 35 volts greater than at half load, the rise being approximately proportional to the load. Increase in the shunt current and ampere-turns is due to the decrease in the inductance of that circuit resulting from the partial saturation of the iron core by the direct-current coils M M'. This effect may also be produced or increased by connecting the shunt coil N beyond the series coil J, as shown in Fig. 2 so that it is fed by an electromotive force that rises with the load. The presence of resistance in the shunt circuit will tend to reduce the lag of the current. In Fig. 2, for example, an increase in the resistance R and a diminution of the inductance L will have this effect; that is, the angle between the shunt-ampere-turns o t and the generator electromotive force o g becomes less than 90°. Other things being equal, this will decrease the effect of the opposing electromotive force o c. Hence by varying the inductance L, or the resistance R, or both, and by altering the relative number of turns in the several coils, the regulating action of the apparatus may be set or adjusted to suit different conditions. In the particular example cited, the generator supplies 650 volts effective and 560 amperes maximum, or 397 amperes effective which gives 258 kilowatts at full load, and the volume occupied by the regulating device is only about 3'×1'×1½' or, 4½ cubic feet. In the example given, it is not attempted to state the voltages, currents, etc., with exactness, because they would depend upon the permeability of the iron core and other practical conditions. Furthermore it was pointed out that there is a transformer action between the shunt and the series alternating-current coils, so that the current supplied to the converter or rectifier is more and the voltage less than in the generator.

I have shown and described some of the forms of apparatus and arrangements by means of which my invention may be practiced but it will be understood that it may be employed in connection with any device for converting alternating into direct-current or vice versa. It will also be understood that the form of the core may be varied to suit different conditions and that it may be of any magnetic material adapted to the purpose. Several coils wound upon or applied to the core may be subdivided or differently arranged in order to modify or adjust their effects. It will also be understood that my invention does not reside in the connections of the coils illustrated, and that these may be altered or reversed in order to change their individual as well as resultant actions.

I do not claim the method herein set forth, as that is claimed in my application Serial No. 218,053, filed July 25, 1904, of which this is a divisional application.

What I claim as new and desire to secure by Letters Patent of the United States is:

1. The combination of a plurality of alternating-current conductors, a plurality of direct-current conductors, a source of supply for one of the sets of conductors, a device connected between these sets of conductors for converting current of the character of one set to that of the character of the other set, and a regulator comprising a core in which alternating flux and inductive action are set up by the alternating current with a series winding connected in the main circuit of the alternating-current conductors, a shunt winding connected between the main alternating-current conductors and a winding connected to the direct-current conductors, substantially as described.

2. The combination of a plurality of alternating-current conductors, a plurality of direct-current conductors, a source of supply for one of the sets of conductors, a device connected between these sets of conductors for converting current of the character of one set to that of the character of the other set, a shunt connection for the main alternating-current conductors, and a regulator comprising a magnetizable core with a series winding connected in the main circuit of the direct-current conductors, a series winding connected in the main circuit of the alternating-current conductors, and a shunt winding included in the shunt connection, substantially as described.

3. The combination of a plurality of alternating-current conductors, a plurality of direct-current conductors, a source of supply for the alternating-current conductors, a rectifying apparatus connecting the sets of conductors, and an automatic regulator comprising a magnetizable core in which alternating flux and inductive action are set up by the alternating-current with a series winding connected in the main circuit of the alternating-current conductors, a shunt winding connected between the main alternating-current conductors and a series winding connected in the main circuit of the direct-current conductors, substantially as described.

4. The combination of a plurality of alternating-current conductors, a plurality of direct-current conductors, a source of supply for the alternating-current conductors, a rectifying device connecting the sets of conductors, a shunt connection to the main alternating-current conductors, and an automatic regulator comprising a magnetizable core with a series winding connected in the main circuit of the alternating-current conductors, a series winding connected in the main circuit of the direct-current conductors, a shunt winding and an adjustable impedance included in the shunt connection, substantially as described.

5. The combination with a plurality of alternating-current conductors, a plurality of direct-current conductors, a source of supply for one of the sets of conductors, and a converting device connecting the sets of conductors, of an automatic regulator comprising a core with a double magnetic circuit and a two-part series winding in the main circuit of the direct-current conductors, the parts of which are oppositely wound on the two parts of the magnetic circuit, substantially as described.

6. The combination with a plurality of alternating-current conductors, a plurality of direct-current conductors, and a converting or rectifying device connecting the sets of conductors, of a regulator comprising a magnetizable core provided with windings connected in series and in shunt with the main alternating-current conductors and also provided with series and shunt windings connected to the direct-current conductors, substantially as described.

7. The combination of a plurality of alternating-current conductors, a plurality of direct-current conductors, a converting or rectifying device connecting the sets of conductors, and a regulator comprising an iron core provided with windings connected in series and in shunt with the main alternating-current conductors, and also provided with windings connected in series and in shunt with the main direct-current conductors, with adjustable impedance in the alternating-current shunt windings, substantially as described.

Signed by me at New York, N. Y., this 31st day of March, 1908.

FRANCIS B. CROCKER.

Witnesses:
MORTON ARENDT,
C. J. HOLSLAG.